United States Patent
Kim et al.

(10) Patent No.: US 10,923,807 B2
(45) Date of Patent: Feb. 16, 2021

(54) COMBO TYPE ANTENNA MODULE

(71) Applicant: AMOTECH CO., LTD., Incheon (KR)

(72) Inventors: Beom-Jin Kim, Incheon (KR); Hyung-Il Baek, Gyeonggi-do (KR); Kyung-Hyun Ryu, Seoul (KR)

(73) Assignee: AMOTECH CO., LTD., Incheon (KR)

( * ) Notice: Subject to any disclaimer, the term of this patent is extended or adjusted under 35 U.S.C. 154(b) by 50 days.

(21) Appl. No.: 15/765,471

(22) PCT Filed: Nov. 4, 2016

(86) PCT No.: PCT/KR2016/012694
§ 371 (c)(1),
(2) Date: Apr. 2, 2018

(87) PCT Pub. No.: WO2017/078481
PCT Pub. Date: May 11, 2017

(65) Prior Publication Data
US 2019/0074577 A1    Mar. 7, 2019

(30) Foreign Application Priority Data
Nov. 5, 2015 (KR) .......................... 10-2015-0155352

(51) Int. Cl.
*H01Q 1/38* (2006.01)
*H01Q 1/52* (2006.01)
(Continued)

(52) U.S. Cl.
CPC ................ *H01Q 1/38* (2013.01); *H01Q 1/52* (2013.01); *H01Q 7/00* (2013.01); *H01Q 1/243* (2013.01)

(58) Field of Classification Search
CPC ...... H01Q 1/2216; H01Q 1/2225; H01Q 1/38; H01Q 1/52; H01Q 5/22; H01Q 7/00;
(Continued)

(56) References Cited

U.S. PATENT DOCUMENTS

| 9,105,967 B2 * | 8/2015 | Park ........................ H01Q 1/243 |
| 9,607,757 B2 * | 3/2017 | Hirobe ...................... H01Q 5/40 |
| 2014/0168019 A1 | 6/2014 | Hirobe et al. | |

FOREIGN PATENT DOCUMENTS

| CN | 103918192 A | 7/2014 |
| JP | 2014-011852 A | 1/2014 |

(Continued)

OTHER PUBLICATIONS

Chinese Office Action No. 201680062315.6.

*Primary Examiner* — Dimary S Lopez Cruz
*Assistant Examiner* — Patrick R Holecek
(74) *Attorney, Agent, or Firm* — CL Intellectual LLC (57) ABSTRACT

The present invention relates to a combo type antenna module capable of maximizing performance of all antennas while minimizing a thickness of the antenna module by laminating a magnetic sheet having different thicknesses according to an antenna pattern formed on a base sheet. The combo type antenna module includes: a first antenna pattern formed on one surface and the other surface of the base sheet; a second antenna pattern formed on one surface of the base sheet; and a magnetic member laminated on the other surface of the base sheet, wherein the magnetic member is formed so that a thickness of a region corresponding to the second antenna pattern is formed thicker than that of a region corresponding to the first antenna pattern.

11 Claims, 4 Drawing Sheets

(51) Int. Cl.
*H01Q 7/00* (2006.01)
*H01Q 1/24* (2006.01)

(58) Field of Classification Search
CPC ...... H04B 5/00; H04B 5/0031; H04B 5/0037; H04B 5/005; H04B 5/0056; H04B 5/0062; H04B 5/0075; H04B 5/0081; H04B 5/0087; G06K 7/10336; G06K 19/07766; G06K 19/07777; G06K 19/07779; G06K 19/07783; G06K 19/07784
See application file for complete search history.

(56) References Cited

FOREIGN PATENT DOCUMENTS

| | | |
|---|---|---|
| KR | 10-2010-0010661 A | 2/2010 |
| KR | 10-1177302 B1 | 8/2012 |
| KR | 10-2014-0034009 A | 3/2014 |
| KR | 10-2014-0044022 A | 4/2014 |

* cited by examiner

COMBO TYPE ANTENNA MODULE

CROSS-REFERENCE TO THE RELATED APPLICATIONS

This application is a National Stage of International Application No. PCT/KR2016/012694, filed Nov. 4, 2016, which claims priority from Korean Patent Application No. 10-2015-0155352 filed on Nov. 5, 2015 in the Korean Intellectual Property Office, the disclosures of which are incorporated herein by reference in their entirety.

TECHNICAL FIELD

Exemplary embodiments of the present invention relate to a comb type antenna module, and more particularly, to a combo type antenna module mounted in a portable terminal to perform near field communication, wireless power transmission, and electronic payment.

BACKGROUND ART

With the development of technology, mobile terminals such as a mobile phone, PDA, PMP, navigation, and a laptop may provide additional functions such as DMB, wireless Internet, and near field communication between devices in addition to basic functions such as telephone conversation, moving picture/music playing, and a guide. Accordingly, the mobile terminal has a plurality of antennas for wireless communications such as wireless Internet, Bluetooth, etc.

In addition, the mobile terminal includes a wireless power transmission antenna for wirelessly charging its own battery. The wireless power transmission antenna is used for charging the battery by magnetic induction or magnetic resonance between the antennas without charging the battery of the mobile terminal through a direct connection of the cable. For example, the wireless power transmission antenna may be classified into magnetic induction type wireless power consortium (WPC), and magnetic resonance type alliance for wireless power (A4WP).

At the same time, the electronic payment market using the mobile terminal such as Samsung Pay is increasing. Accordingly, an electronic payment antenna (hereinafter, magnetic secure transmission (MST) antenna) and an NFC antenna are mounted on the mobile terminal.

Recently, a combo type antenna module in which the plurality of antennas are implemented as one module is being developed. The combo type antenna module is a kind of antenna formed by integrating antennas, such as the magnetic induction type wireless power consortium antenna, the magnetic resonance type alliance for wireless power antenna, the near field communication (NFC) antenna, and the electronic payment (MST) antenna, in a limited space.

In the combo type antenna module, since various antennas are formed in the limited space, it is necessary to combine a shielding material with antennas in the form of a flexible circuit board (FPCB).

Figure 1:
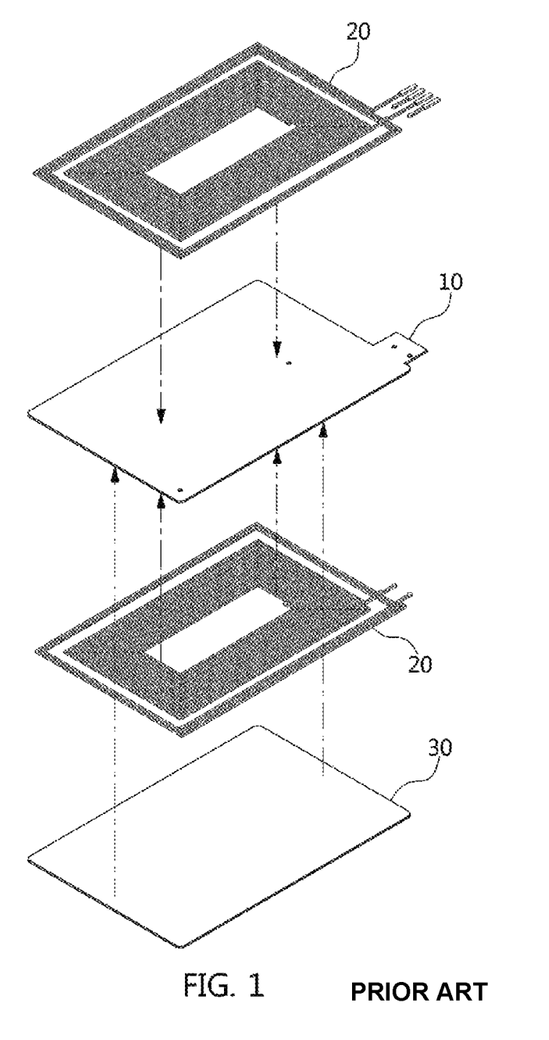
FIGS. 1 and 2 are diagrams for describing the existing combo type antenna module.
Figure 2:
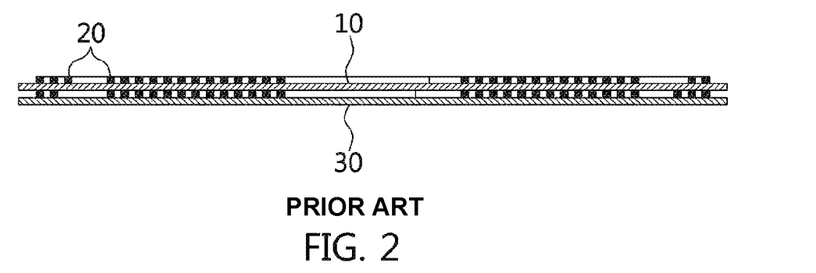

Referring to FIGS. 1 and 2, the conventional combo type antenna module includes antenna patterns 20 (i.e., WPC, MST, NFC, A4WP and the like) on upper and lower surfaces of a base sheet 10 made of polyimide (PI). At this time, a shielding sheet 30 is laminated on the antenna pattern 20 formed on one surface of the base sheet 10.

However, the conventional combo type antenna module has a problem in that the performance of some of the antennas (e.g., NFC, A4WP) is lowered because the shielding sheet of the same thickness and material is laminated regardless of the kind of antenna.

DISCLOSURE

Technical Problem

The present invention is proposed to solve the above conventional problems, and an object of the present invention is to provide a combo type antenna module capable of maximizing performance of all antennas while minimizing a thickness of the antenna module by laminating a magnetic sheet having different thicknesses according to an antenna pattern formed on a base sheet.

Technical Solution

In accordance with one aspect of the present invention, a combo type antenna module, includes: a base sheet; a first antenna pattern formed on one surface and the other surface of the base sheet; a second antenna pattern formed on one surface of the base sheet; and a magnetic member laminated on the other surface of the base sheet, wherein the magnetic member is formed so that a thickness of a region corresponding to the second antenna pattern is formed thicker than that of a region corresponding to the first antenna pattern. At this time, the magnetic member may be formed so that the region corresponding to the second antenna pattern and the region corresponding to the first antenna pattern are made of different materials.

The magnetic member may include a magnetic sheet, the magnetic sheet may be provided with an insertion hole into which the first antenna pattern is inserted, and the magnetic sheet may be laminated on a region corresponding to the second antenna pattern in the other surface of the base sheet.

The magnetic member may further include another magnetic sheet, the another magnetic sheet may be laminated on the first antenna pattern formed on the other surface of the base sheet. At this time, at least a part of the another magnetic sheet may be inserted into the insertion hole.

The thickness of the magnetic sheet may be larger than or equal to that of the another magnetic sheet, and the magnetic sheet and the another magnetic sheet may be made of different materials.

The magnetic member may further include another magnetic sheet, and the another magnetic sheet may be laminated on the first antenna pattern formed on the other surface of the base sheet and the magnetic sheet. At this time, the magnetic sheet and the another magnetic sheet may be made of different materials.

The first antenna pattern may include: a first radiation pattern formed on one surface of the base sheet and formed in a loop shape in which the first radiation pattern is wound on one surface of the base sheet; a second radiation pattern formed on one surface of the base sheet and formed in a loop shape in which the second radiation pattern extends from one end of the first radiation pattern and winds the first radiation pattern; and a third radiation pattern formed on the other surface of the base sheet and having one end connected to the other end of the first radiation pattern.

At this time, the first antenna pattern may further include a connection pattern connecting one end of the first radiation pattern to a third terminal pattern, the other end of the second radiation pattern may be connected to a fourth terminal pattern, and the other end of the third radiation pattern may be connected to a second terminal pattern.

The second antenna pattern may be formed in a loop shape in which the second antenna pattern winds an outer circumference of the first antenna pattern. At this time, one end of the second antenna pattern may be connected to a first terminal pattern, and one end of the second antenna pattern may be connected to a fifth terminal pattern.

Advantageous Effects

According to the combo type antenna module of the present invention, the magnetic sheet having different materials and thicknesses are used in the region in which the magnetic induction type wireless power transmission antenna and the magnetic secure transmission antenna are formed and the region in which the magnetic resonance alliance for wireless power antenna and the near field communication antenna are formed, thereby maximizing the communication performance of the magnetic induction type wireless power transmission, the magnetic secure transmission, the magnetic resonance type alliance for wireless power, and the near field communication while minimizing the thickness of the antenna module.

In addition, according to the combo type antenna module of the present invention, the antenna patterns for the magnetic resonance type alliance for wireless power and the near field communication which are in the relatively low frequency band are formed only on one surface of the base sheet to increase the thickness of the magnetic sheet while minimizing the thickness of the antenna module, thereby securing the communication performance equivalent to or above that of the existing antenna forming the antenna patterns for the magnetic resonance type alliance for wireless power and the near field communication, which are in the low frequency band, on both surfaces of the base sheet.

BEST MODE

Hereinafter, the most preferred embodiments of the present invention will be described in detail with reference to the accompanying drawings so that those skilled in the art may easily practice the technical spirit of the present invention. First, it is to be noted that in giving reference numerals to components of each of the accompanying drawings, the same components will be denoted by the same reference numerals even though they are illustrated in different drawings. Further, in describing exemplary embodiments of the present invention, when it is determined that detailed description of known functions or configuration may obscure the gist of the present invention, the detailed description thereof will be omitted.

Figure 3:
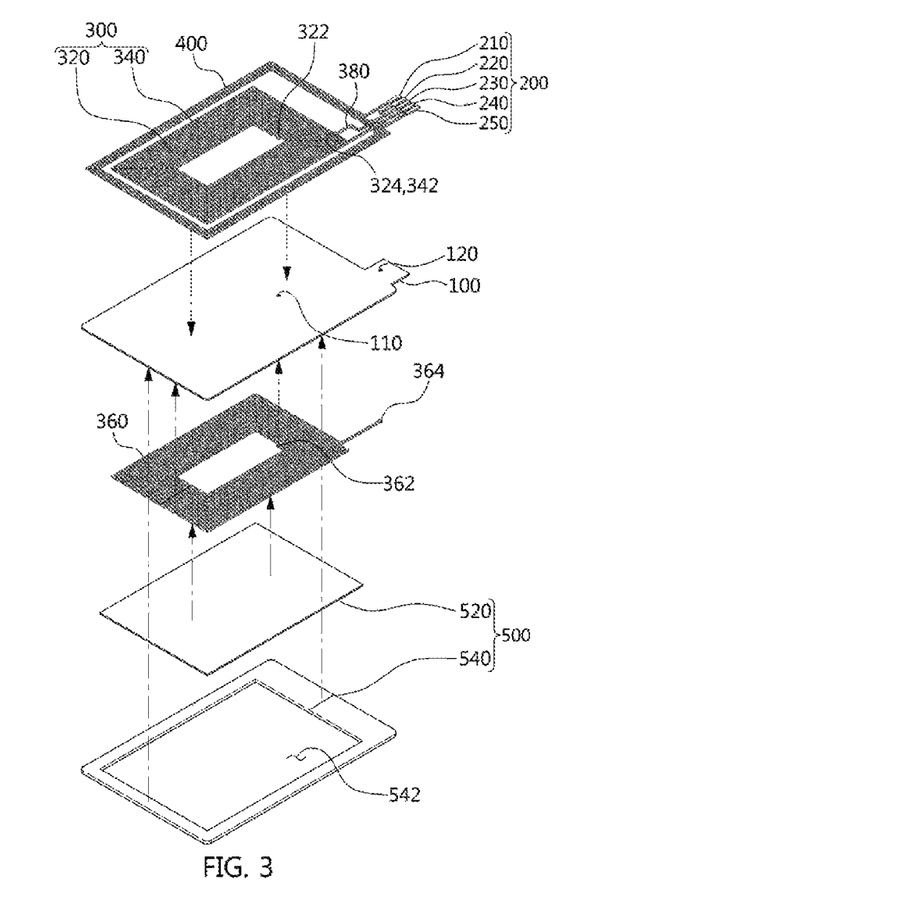
FIGS. 3 and 4 are diagrams for describing a combo type antenna module according to an embodiment of the present invention.
Figure 4:
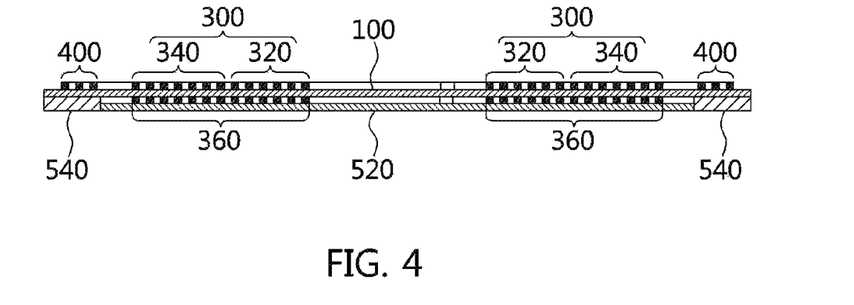

Referring to FIGS. 3 and 4, a combo type antenna module according to an embodiment of the present invention includes a base sheet 100, a terminal portion 200, a first antenna pattern 300, a second antenna pattern 400, and a magnetic member 500. In this configuration, the magnetic member 500 includes a first magnetic sheet 520 and a second magnetic sheet 540.

The base sheet 100 is configured of a circuit board (e.g., printed circuit board (PCB), a flexible printed circuit board (FPCB) and the like) which is made of a synthetic resin such as polyimide (PI) and polyethylene terephthalate (PET).

The terminal portion 200 includes a plurality of terminal patterns, and is formed on one surface of the base sheet 100. For example, the terminal portion 200 may include a first terminal pattern 210 to a fifth terminal pattern 250. Here, the first terminal pattern 210 is terminals for a WPC antenna and an MST antenna, the second terminal pattern 220 is the terminal for the WPC antenna, and the third terminal pattern 230 is the terminal for the MST antenna. A fourth terminal pattern 240 and the fifth terminal pattern 250 are terminals for an A4WP antenna and an NFC antenna.

The first antenna pattern 300 is formed on upper and lower surfaces of the base sheet 100. The first antenna pattern 300 is formed in a loop shape that it is wound on one surface of the base sheet 100 and may be formed on the upper and lower surfaces of the base sheet 100 in the same shapes or different shapes. Here, the first antenna pattern 300 may have various shapes such as a quadrangle, a circle, and an ellipse.

At this time, the first antenna pattern 300 may be formed by patterning a conductive material, such as a copper foil, on a surface of the base sheet 100 in a loop shape or printing a loop-shaped metal pattern using conductive ink.

The first antenna pattern 300 may be formed of a plate-like coil in which a conductive member such as a wire is wound plural times. Here, the first antenna pattern 300 may also be formed by laminating the plate-like coil on one surface and printing or patterning a metal pattern on the other surface.

The first antenna pattern 300 is operated by a magnetic induction type wireless power transmission antenna (hereinafter, referred to as a wireless power consortium (WPC) antenna) and a magnetic secure transmission antenna (hereinafter, referred to as a magnetic secure transmission (MST) antenna).

At this time, since the WPC antenna uses a frequency band of about 100 kHz to 300 kHz, it is configured using a part of an inner side of the first antenna pattern 300, and since the MST antenna uses a frequency band of about 70 kHz, it is configured using the whole of the first antenna pattern 300. That is, since the MST antenna uses a frequency band lower than that of the WPC antenna, a relatively longer radiation pattern is required. For this reason, a part of the inner side of the first antenna pattern 300 configures the WPC antenna, and the whole of the first antenna pattern 300 configures the MST antenna.

To this end, the first antenna pattern 300 includes a first radiation pattern 320, a second radiation pattern 340, and a third radiation pattern 360.

The first antenna pattern 300 is formed on one surface of the base sheet 100. The first radiation pattern 320 has a loop shape in which it is wound on one surface of the base sheet 100.

One end 322 of the first radiation pattern 320 is connected to one end 362 of the third radiation pattern 360, which is formed on the other surface of the base sheet 100, through a via hole 110 formed on the base sheet 100. The other end 324 of the first radiation pattern 320 is connected to one end 342 of the second radiation pattern 340 formed on the same surface. At this time, the other end 324 of the first radiation pattern 320 is connected to the third terminal pattern 230 through a connection pattern 380.

The second radiation pattern 340 is formed on one surface of the base sheet 100 like the first radiation pattern 320. The second radiation pattern 340 has a loop shape in which it is wound around an outer circumference of the first radiation pattern 320 plural times. The second radiation pattern 340 has a loop shape in which one end 342 thereof extends from the other end 324 of the first radiation pattern 320 and is wound around the outer circumference of the first radiation pattern 320. At this time, the other end of the second radiation pattern 340 is connected to the fourth terminal pattern 240.

The third radiation pattern 360 is formed on the other surface of the base sheet 100. One end 362 of the third radiation pattern 360 is connected to one end 322 of the first radiation pattern 320 through the via hole 110. The other end 364 of the third radiation pattern 360 is connected to the second terminal pattern 220 through the via hole 120.

According to the above-mentioned structure, the first radiation pattern 320 and the third radiation pattern 360 configure a WPC antenna and the first radiation pattern 320 to the third radiation pattern 360 configure an MST antenna, such that the first antenna pattern 300 is operated as the WPC antenna and the MST antenna.

The second antenna pattern 400 is formed on one surface of the base sheet 100. The second antenna pattern 400 may have the loop shape in which it is wound around the outer circumference of the first antenna pattern 300 formed on one surface of the base sheet 100.

At this time, the second antenna pattern 400 may be formed by patterning a conductive material, such as a copper foil, on a surface of the base sheet 100 in the loop shape or printing a loop-shaped metal pattern using conductive ink.

The second antenna pattern 400 may be formed of a plate-like coil in which a conductive member such as a wire is wound plural times. Here, the second antenna pattern 400 may also be formed by laminating the plate-like coil on one surface and printing or patterning a metal pattern on the other surface.

The second antenna pattern 400 is operated by a magnetic resonance type wireless power transmission antenna (hereinafter, referred to as alliance for wireless power (A4WP) antenna) and a near field communication antenna (hereinafter, referred to as an NFC antenna).

At this time, since the A4WP antenna uses a frequency band of about 6.78 MHz and the NFC antenna uses a frequency band of about 13.56 MHz, the whole of the second antenna pattern 400 is operated as the A4WP antenna and the NFC antenna.

Here, one end of the second antenna pattern 400 has one end connected to the first terminal pattern 210 and the other end thereof is connected to the fifth terminal pattern 250 to form the A4WP antenna and the NFC antenna.

The magnetic member 500 is laminated on the other surface of the base sheet 100. The magnetic member 500 is formed so that a region corresponding to the first antenna pattern 300 and a region corresponding to the second antenna pattern 400 have different thicknesses and materials. At this time, it is preferable that the magnetic member 500 is formed so that the thickness of the region corresponding to the second antenna pattern 400 is larger than that of the region corresponding to the first antenna pattern 300.

To this end, the magnetic member 500 may include the first magnetic sheet 520 which is laminated on the region corresponding to the first antenna pattern 300 and the second magnetic sheet 540 which is laminated on the region corresponding to the second antenna pattern 400.

The first magnetic sheet 520 is laminated on the other surface of the base sheet 100. That is, the first magnetic sheet 520 is laminated on the other surface of the base sheet 100 on which the second antenna pattern 400 is not formed. At this time, the first magnetic sheet 520 has a plate shape having an area covering only the region in which the first antenna pattern 300 is formed to shield a magnetic field generated from the first antenna pattern 300, thereby preventing the magnetic field from being leaked to the outside and focusing a magnetic flux in a required direction.

Accordingly, the first magnetic sheet 520 focuses the magnetic field generated from the first antenna pattern 300 in one direction to improve characteristics of the WPC antenna and the MST antenna. At this time, the first magnetic sheet 520 shields the magnetic field generated when a radio signal in a predetermined frequency band is transmitted from the first antenna pattern 300, thereby increasing the focusing effect of the magnetic field in one direction and the characteristics of the antenna operated in the predetermined frequency band.

The second magnetic sheet 540 is laminated on the other surface of the base sheet 100. That is, the second magnetic sheet 540 is laminated on the other surface of the base sheet 100 on which the second antenna pattern 400 is not formed. At this time, the second magnetic sheet 540 has a plate shape having an area covering only the region in which the second antenna pattern 400 is formed to shield a magnetic field generated from the second antenna pattern, thereby preventing the magnetic field from being leaked to the outside and focusing a magnetic flux in a required direction.

Accordingly, the second magnetic sheet 540 focuses the magnetic field generated from the second antenna pattern 400 in one direction to improve characteristics of the NFC antenna and the A4WP antenna. At this time, the second magnetic sheet 540 shields the magnetic field generated when a radio signal in a predetermined frequency band is transmitted from the second antenna pattern 400, thereby increasing the focusing effect of the magnetic field in one direction and the characteristics of the antenna operated in the predetermined frequency band.

The second magnetic sheet 540 is provided with an insertion hole 542 into which at least a part of the first antenna pattern 300 and the first magnetic sheet 520 is inserted. At this time, the insertion hole 542 is formed at a position corresponding to the region in which the first antenna pattern 300 is formed, and is formed to have an area larger than that of the first antenna pattern 300. Here, the insertion means that the first magnetic sheet 520 is completely inserted into the insertion hole 542 of the second magnetic sheet 540, or a part of the first magnetic sheet 520 is inserted to protrude.

The second magnetic sheet 540 is formed to have a thickness equal to or larger than the thickness of the first magnetic sheet 520 and the thickness of the first antenna pattern 300. The second magnetic sheet 540 is formed to have a thickness equal to or less than a sum of the thickness of the first magnetic sheet 520 and the thickness of the first antenna pattern 300.

To this end, the first magnetic sheet 520 and the second magnetic sheet 540 may be made of a magnetic material capable of shielding a magnetic field. At this time, the first magnetic sheet 520 and the second magnetic sheet 540 may be made of the same magnetic material or different magnetic materials.

For example, the first magnetic sheet 520 and the second magnetic sheet 540 are formed of a ribbon sheet, a ferrite sheet, a polymer sheet and the like of an amorphous alloy or a nano-crystal grain alloy. Here, the ferrite sheet may be a sintered ferrite sheet, and Ni—Zn ferrite or Mn—Zn ferrite may be used. As the amorphous alloy or the nano-crystal grain alloy, Fe-based or Co-based magnetic alloys may be used. The polymer sheet may be made of an Fe—Si—Al-based metal polymer or an Fe—Si—Cr-based metal polymer.

Meanwhile, the first magnetic sheet 520 and the second magnetic sheet 540 may have a shape in which a ribbon sheet made of a plurality of amorphous alloys or nanocrystal grain alloys is laminated.

Of course, the first magnetic sheet 520 and the second magnetic sheet 540 may be separated into a plurality of micro pieces to increase a resistance and suppress an eddy current from being generated, in which the plurality of micro pieces may be provided to be insulated on the whole or partially between neighboring micro pieces. At this time, the plurality of micro pieces may be provided in a size of about 1 μm to 3 mm, and each piece may be randomly formed irregularly.

In the case where a plurality of sheets separated in micro pieces are laminated to configure the first magnetic sheet 520 and the second magnetic sheet 540, an adhesive layer made of a non-conductive material may be disposed between the respective sheets to be permeated between a pair of sheets laminated to each other, such that the adhesive layer may serve to insulate the plurality of micro pieces configuring the respective sheets. Here, the adhesive layer may be provided as an adhesive or may be provided in a form in which an adhesive is applied on one side or both sides of a substrate in a film form.

The first magnetic sheet 520 and the second magnetic sheet 540 are formed to have different thicknesses. That is, the first magnetic sheet 520 and the second magnetic sheet 540 may be formed to have different thicknesses for each antenna (i.e., WPC, A4WP, NFC, and MST) to improve the antenna performance of the first antenna pattern 300 and the second antenna pattern 400 while minimizing the thickness of the combo type antenna module.

For example, the first magnetic sheet 520 may be laminated on the first antenna pattern 300 while being formed to have a predetermined thickness, and the second magnetic sheet 540 may be formed to have a thickness equal to or less than a sum of the thickness of the first antenna pattern 300 and the thickness of the first magnetic sheet 520.

As the frequency increases by the surface effect, an alternating current intensively flows into a surface of metal rather than to an inside of the metal. At a low frequency, a signal moves while a charge moves inside the metal, but at the high frequency, a charge moves along a surface of a conductor.

This surface effect may be represented by the following equation (1).

$$\text{Skin depth } (\delta_s) = \frac{1}{\alpha} = \sqrt{\frac{2}{2\pi f \mu \sigma}} \quad [\text{Equation 1}]$$

In the above Equation 1, μ represents magnetic permeability, α represents conductivity, and f represents frequency.

In the above Equation 1, it can be known how deep a current is permeated depending on the relationship between the frequency and the metal component. Since the thicker the metal component (i.e., the magnetic sheet), the smaller the loss and the higher the frequency, the lower the skin depth, the metal component having thinner thickness may be used.

At this time, since the magnetic permeability and the resonance frequency have an inversely proportion relationship, the kind of the magnetic sheet may vary depending on the frequency.

Since the WPC antenna and the MST antenna use a low frequency band, the first magnetic sheet 520 of the same material may be used.

Since the A4WP antenna and the NFC antenna use the second magnetic sheet 540 of the same material but use a relatively higher frequency band than the WPC antenna and the MST antenna, the second magnetic sheet 540 of a material different from the first magnetic sheet 520 is used.

Since the first antenna pattern 300 is operated as the WPC antenna and the MST antenna, the thickness of the radiation pattern (i.e., the thickness of the first antenna pattern 300) may be formed to have about 3.4 Oz. At this time, if the first magnetic sheet 520 is formed to have a thickness of about 0.1 mm, the performance of the WPC antenna and the MST antenna may be maintained.

In contrast, since the second antenna pattern 400 is operated as the A4WP antenna and the NFC antenna using a relatively higher frequency band than the WPC antenna and the MST antenna, the second antenna pattern 400 may be formed to have a thickness thinner than the first antenna pattern 300. At this time, if the second magnetic sheet 540 is formed to have a thickness of about 0.15 mm or more, the performance of the A4WP antenna and the NFC antenna may be maintained.

Therefore, the second magnetic sheet 540 is formed thicker than the first magnetic sheet 520. Here, if the thickness of the second magnetic sheet 540 is thicker than that of the first magnetic sheet 520, the thickness of the combo type antenna module is increased, the second antenna pattern 400 is formed only on the lower surface of the base sheet 100 to secure the thickness of the second magnetic sheet 540.

Figure 5:
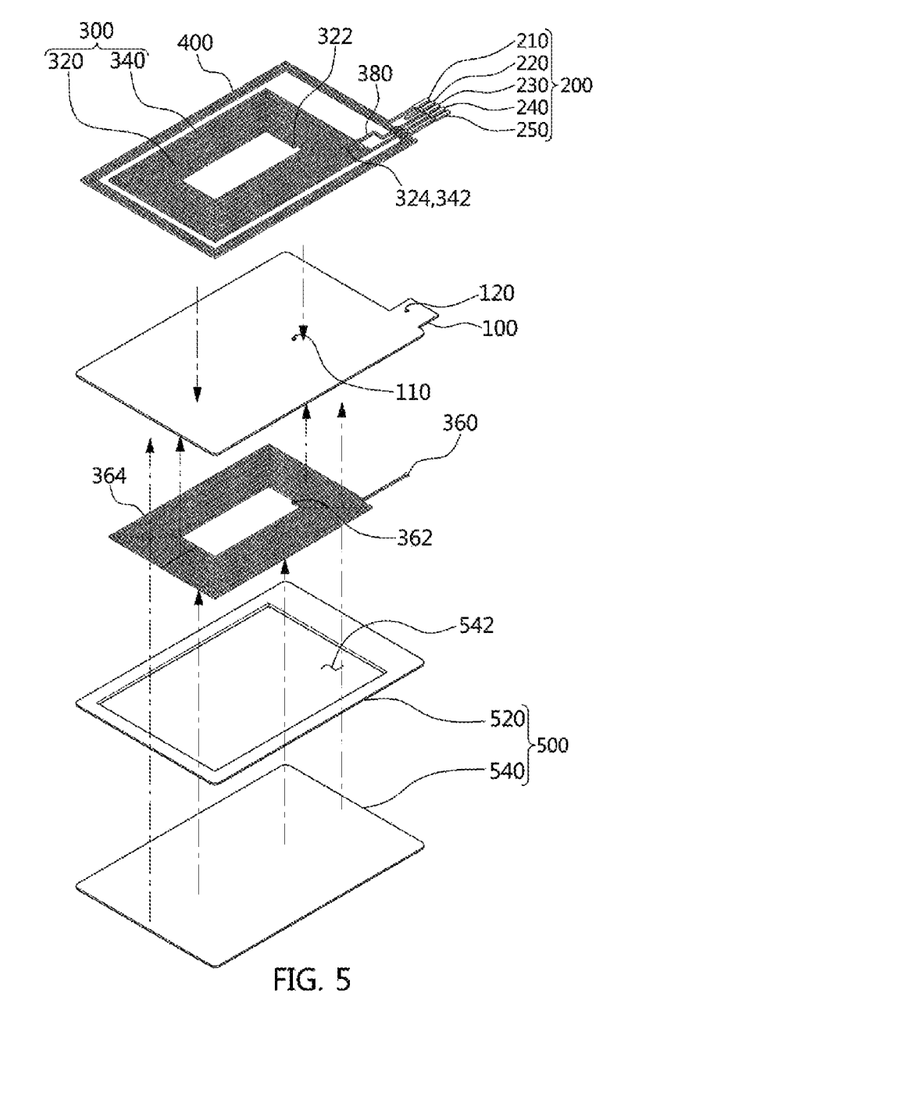
FIGS. 5 and 6 are diagrams for explaining a modification of a magnetic sheet of FIG. 3.
Figure 6:
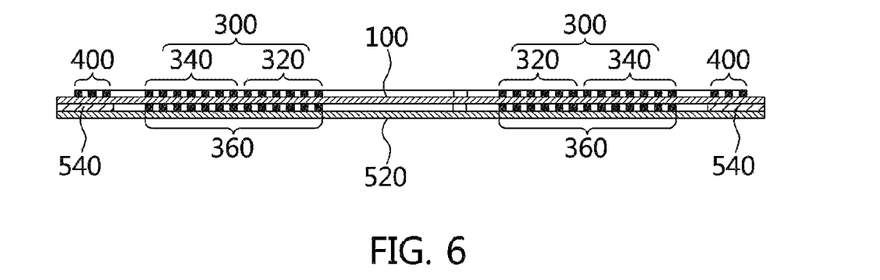

Meanwhile, referring to FIGS. 5 and 6, the second magnetic sheet 540 is formed to have a thickness equal to or less than that of the first antenna pattern 300. The second magnetic sheet 540 is formed in a plate shape in which it completely covers the second antenna pattern 400 to be laminated on one surface of the base sheet 100.

The second magnetic sheet 540 is provided with the insertion hole 542. At this time, as the second magnetic sheet 540 is laminated on the base sheet 100, the first antenna pattern 300 formed on one surface of the base sheet 100 is inserted into the insertion hole 542 of the second magnetic sheet 540.

The first magnetic sheet 520 is formed in the plate shape in which it completely covers one surface of the base sheet 100. The first magnetic sheet 520 is laminated on the upper surface of the first antenna pattern 300 and the second magnetic sheet 540.

Accordingly, the thickness (i.e., the thickness obtained by summing the thicknesses of the first magnetic sheet 520 and the second magnetic sheet 540) of the shielding material in the region in which the second antenna pattern 400 is formed thicker than the thickness (i.e., the thickness of the first magnetic sheet 520) of the shielding material laminated on the first antenna pattern 300.

Hereinabove, the preferred embodiments according to the present invention have been described, but various modifications may be made, and it is understood that a person having ordinary skill in the art may practice various modifications and changes without departing from the scope of claims of the present invention.

The invention claimed is:

1. A combo type antenna module, comprising:
a base sheet;
a first antenna pattern formed on one surface and the other surface of the base sheet;
a second antenna pattern formed on the one surface of the base sheet; and
a magnetic member laminated on the other surface of the base sheet,
wherein the magnetic member is formed so that a thickness of a region corresponding to the second antenna pattern is formed thicker than that of a region corresponding to the first antenna pattern,
wherein the magnetic member includes a magnetic sheet and another magnetic sheet,
wherein the magnetic sheet is provided with an insertion hole into which the first antenna pattern is inserted, and the magnetic sheet is laminated on a region corresponding to the second antenna pattern in the other surface of the base sheet, and
wherein the another magnetic sheet is laminated on the first antenna pattern formed on the other surface of the base sheet and the another magnetic sheet is inserted into the insertion hole.

2. The combo type antenna module of claim 1, wherein the magnetic member is formed so that the region corresponding to the second antenna pattern and the region corresponding to the first antenna pattern are made of different materials.

3. The combo type antenna module of claim 1, wherein the thickness of the magnetic sheet is larger than or equal to that of the another magnetic sheet.

4. The combo type antenna module of claim 1, wherein the magnetic sheet and the another magnetic sheet are made of different materials.

5. The combo type antenna module of claim 1, wherein the another magnetic sheet is laminated on the first antenna pattern and the magnetic sheet.

6. The combo type antenna module of claim 5, wherein the magnetic sheet and the another magnetic sheet are made of different materials.

7. The combo type antenna module of claim 1, wherein the first antenna pattern includes:
a first radiation pattern formed on the one surface of the base sheet and formed in a loop shape in which the first radiation pattern is wound on the one surface of the base sheet;
a second radiation pattern formed on the one surface of the base sheet and formed in a loop shape in which the second radiation pattern extends from one end of the first radiation pattern and winds the first radiation pattern; and
a third radiation pattern formed on the other surface of the base sheet and having one end connected to the other end of the first radiation pattern.

8. The combo type antenna module of claim 7, wherein the first antenna pattern further includes a connection pattern connecting one end of the first radiation pattern to a third terminal pattern.

9. The combo type antenna module of claim 8, wherein the other end of the second radiation pattern is connected to a fourth terminal pattern, and the other end of the third radiation pattern is connected to a second terminal pattern.

10. The combo type antenna module of claim 1, wherein the second antenna pattern is formed in a loop shape in which the second antenna pattern winds an outer circumference of the first antenna pattern.

11. The combo type antenna module of claim 10, wherein one end of the second antenna pattern is connected to a first terminal pattern, and one end of the second antenna pattern is connected to a fifth terminal pattern.

\* \* \* \* \*